Re. 24472

Aug. 28, 1956     H. E. FARMER     2,760,366
BEARING QUALITY TESTING MACHINE

Filed June 2, 1953     3 Sheets—Sheet 1

INVENTOR.
HORACE E. FARMER.
BY
Wallace P. Lamb,
ATTORNEY.

Aug. 28, 1956

H. E. FARMER 2,760,366

BEARING QUALITY TESTING MACHINE

Filed June 2, 1953

INVENTOR.
HORACE E. FARMER.
By
Wallace P. Lamb.
ATTORNEY.

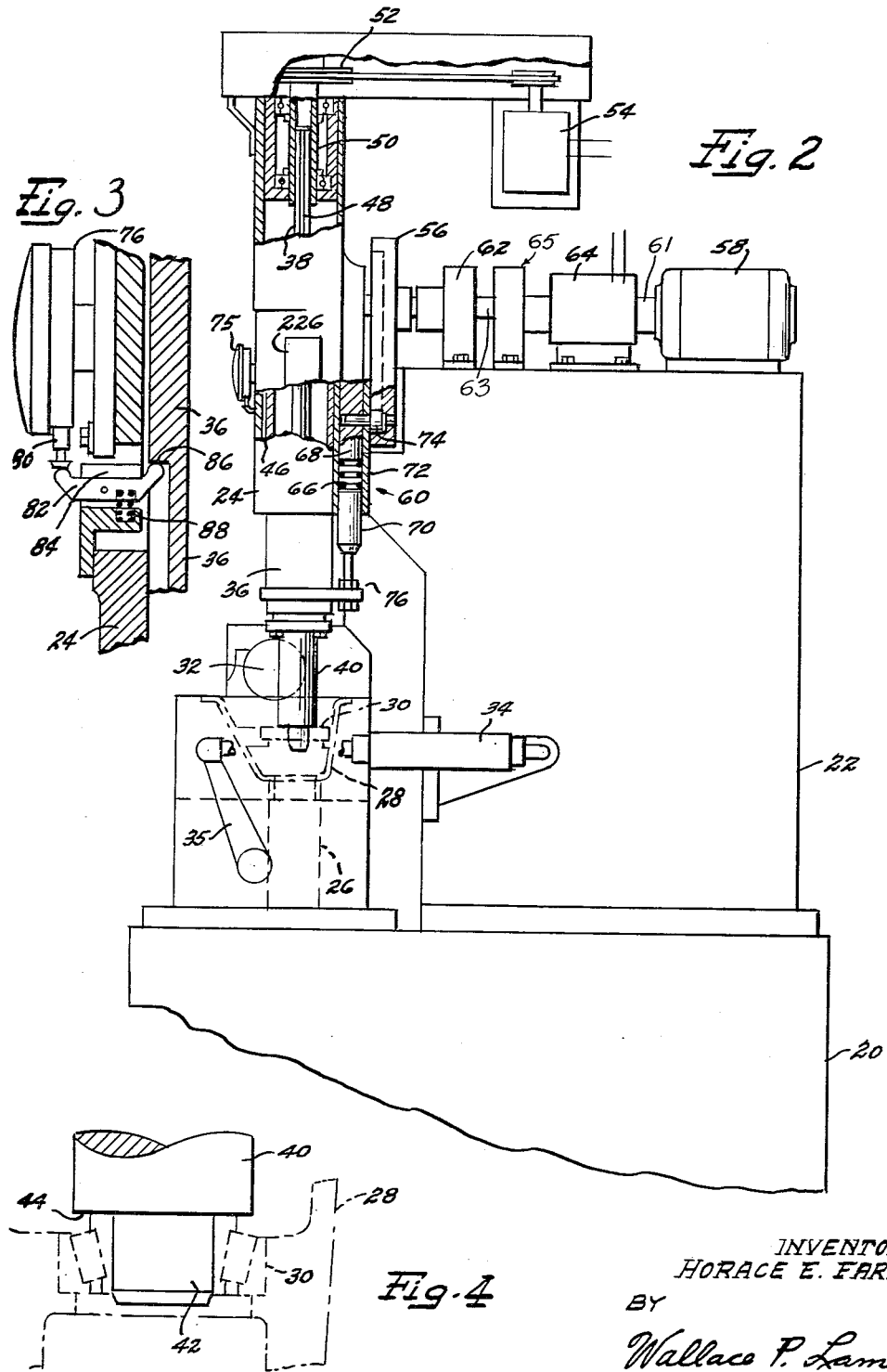

United States Patent Office 2,760,366
Patented Aug. 28, 1956

2,760,366

BEARING QUALITY TESTING MACHINE

Horace E. Farmer, Grosse Pointe Farms, Mich.

Application June 2, 1953, Serial No. 359,193

5 Claims. (Cl. 73—9)

This invention relates generally to testing apparatus and particularly to apparatus for testing the accuracy of manufacture of roller thrust bearings.

One of the objects of my invention is to provide for accurately and quickly testing the quality of a roller thrust bearing.

Another object of my invention is to provide a machine for testing roller bearings which will reject roller bearings that have a lesser percentage of surface area of the rollers and races in contact than required to rate the bearing as passable.

Another object of my invention is to provide a machine that will detect poorly made bearings in time to prevent their use in assemblies so as to reduce materially the present cost of rejected assemblies, the cost of dissembling the rejected assemblies, as well as, to increase the period of usefulness of such assemblies.

Other objects of the invention will become apparent from the following detail description taken in connection with the accompanying drawings in which Fig. 1 is a front perspective view of my roller bearing testing machine;

Fig. 2 is a side view thereof with parts broken away and in section;

Fig. 3 is an enlarged fragmentary sectional view of a detail of the machine;

Fig. 4 is an enlarged view in section, illustrating a roller bearing under test.

Figure 1:
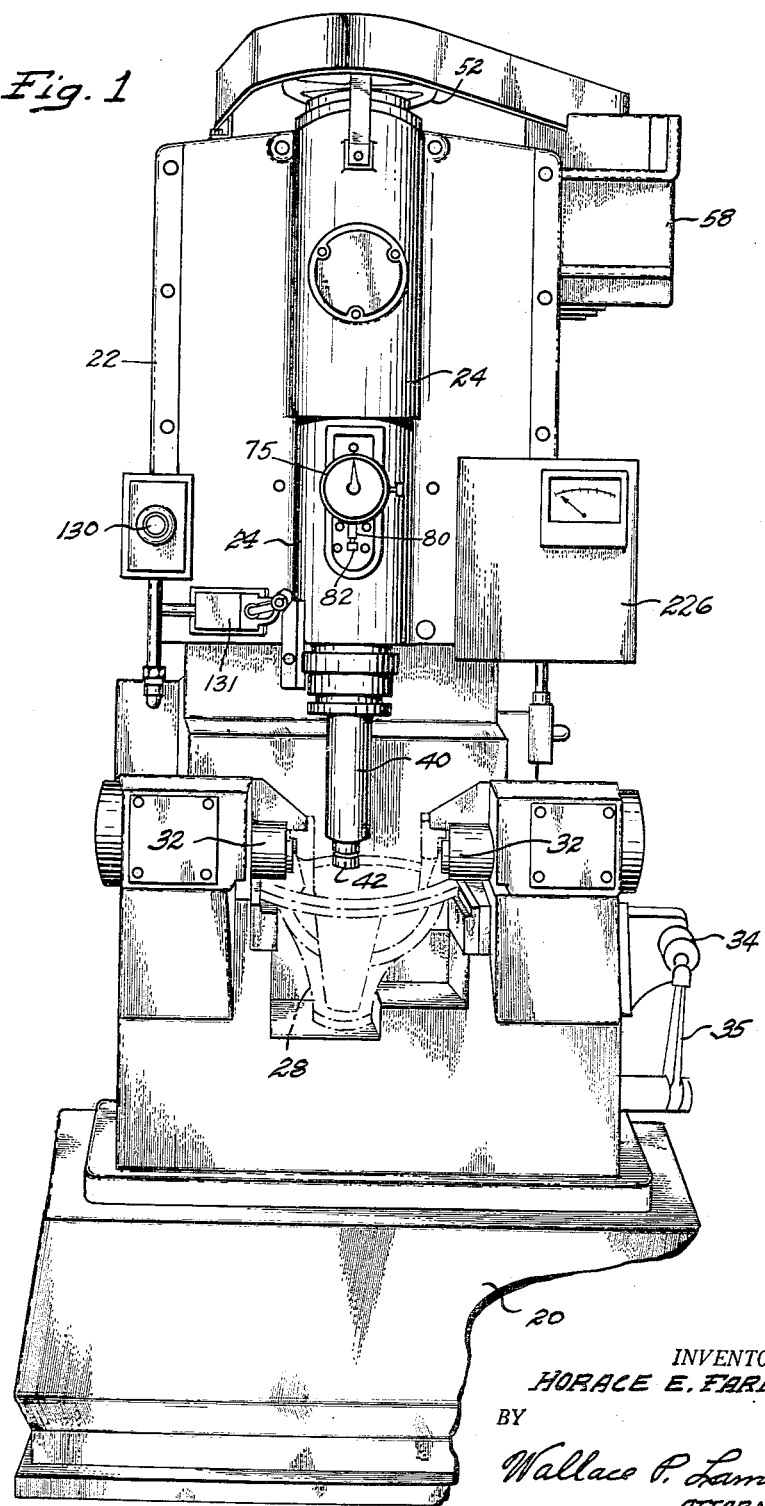

Referring to the drawings by characters of reference, my bearing testing apparatus includes a machine having a base 20, a superstructure 22 and a column 24. Supported by and extending upwardly from the base 20 is a jack or anvil 26 to support a housing 28 containing a bearing 30 to be tested for quality and for use in the housing. In the present instance, the housing 28 is a section of a motor vehicle differential housing and the bearing 30 is to be tested for use in the housing and for bearing quality. Bearing quality as used here has to do with percentage of surface contact between rollers and bearing races under an applied axial thrust on the bearing. That is, if a bearing under test of an axial thrust does not develop a predetermined torque, the bearing is considered of low quality and unsuitable.

Above the anvil 26, a pair of oppositely disposed, and horizontally retractable holders 32 engage in openings in the bosses of the housing 28 to hold the same against movement. The type of fixture or any of the other well known holding fixtures may be used to hold the housing 28 against movement and for quick release of the part. The mechanism for moving the holders 32 is not shown or described in detail since such mechanism is well known and forms no part of the present invention. However, the mechanism comprises essentially, shafts and gears which may be housed in superstructure 22 and may be operated by an air pressure cylinder 34 and lever 35 or by any other suitable means.

In the column 24 is a vertically movable carrier 36 which carries a rotatable shaft 38 to the lower end of which is secured a member or quill 40. The quill 40 has a lower end portion 42 of reduced diameter to engage in the inner race of the bearing and the reduced portion provides a downwardly facing shoulder 44 to seat on the upper end of the bearing inner race (see Fig. 4).

The carrier 36 is keyed at 46 to the column 24 to prevent turning of the carrier, and the shaft 38 is journaled in the carrier 36 by thrust bearings (not shown) through which vertical movement of the carrier is transmitted to the shaft. At its upper end, the shaft 38 is splined, as at 48, to a driven shaft 50 of a pulley 52 which is driven by an electric motor 54 by means of a belt drive.

The mechanism for moving the quill 40 downwardly into driving relation with bearing 30 comprises, in general, a cam 56, a cam operating motor 58, and a thrust device 60. The cam 56 is mounted on the column 24 to rotate about a horizontal axis, and the thrust device 60 is also mounted on the column and arranged between the cam 56 and the carrier 36. Motor 58 is mounted on top of the machine superstructure 22 and drives the cam 56 through a speed reducing mechanism 62, drive shaft components 61, 63, and an electrically operated device or magnetic clutch 64. These devices may be mounted on top of the superstructure 22. The magnetic clutch 64 controls operation of cam 56 by motor 58 by coupling the shaft components 61, 63 together or by uncoupling said shaft. Motor 58 preferably runs constantly as the machine is required to test bearings in accordance with a high production quota. When the magnetic clutch 64 is energized, the motor 58 and cam 56 are coupled together and when clutch 64 is deenergized the devices are uncoupled. On shaft component 63, between clutch 64 and the cam 56 I provide a magnetic brake 65 to stop rotation of cam 56 when the cam is uncoupled from the motor 58.

The thrust device 60 comprises essentially a compression spring 66 by means of which a gradually increasing thrust is imparted axially to the bearing 30 as the upper race is rotated. The spring 66 is retained between the opposed ends of vertically movable thrust rods 68, 70 which are guided vertically in a tube 72 that is secured to the column 24, between the column and cam 56. The upper thrust rod 68 carries a laterally extending follower 74 which rides on the cam surface of cam 56, and the lower thrust rod 70 is secured rigidly, as at 76, to the lower end of the carrier 36.

As is well known, manufacturing inaccuracies appear in the casting and machining of the housing 28 and to compensate for these, shims (not shown) are placed back of the bearing so that the bearing will be properly located within the housing 28. In the present machine there is mounted on the column 24, a gage 75 for registering, in response to the downward movement of the quill 40, the number of shims or shim thicknesses required for any given bearing-housing assembly. The gage 75 may have a dial preferably calibrated to indicate number of shims. A gage operating plunger 80 is operated by a lever 82 which is pivoted to and in an opening 84 in column 24 for operation by the vertically movable carrier 36. The outer end of lever 82 engages the lower end of gage plunger 80 and the inner end of the lever engages a downwardly facing shoulder 86 on the carrier 36. A light spring 88 holds the inner end of lever 82 in engagement with the carrier shoulder 86.

Figure 5:
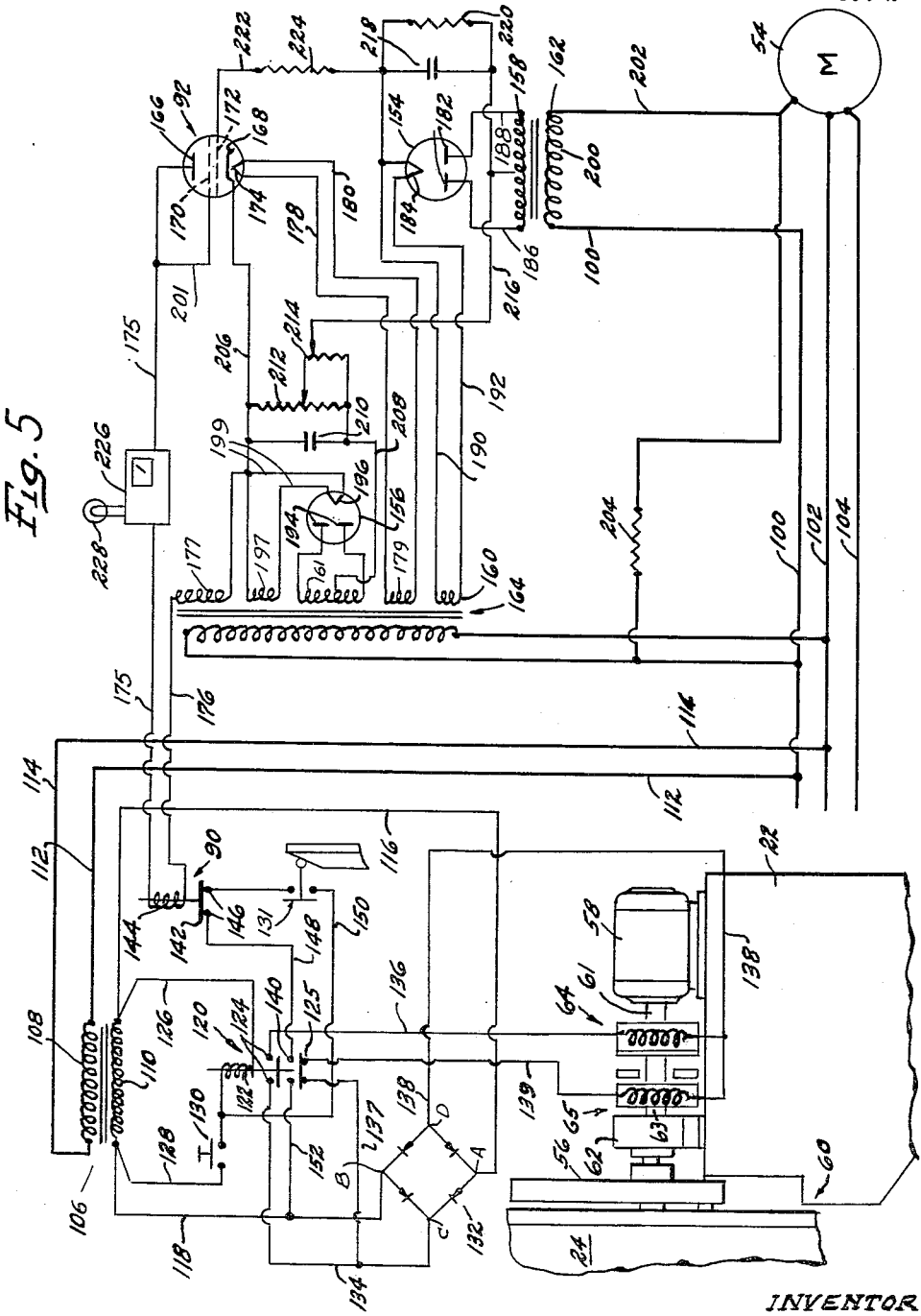
Fig. 5 is a diagrammatic illustration of machine and control system therefor.

With particular reference to Fig. 5, the magnetic clutch 64 is controlled by a main relay switch 90 which in turn is controlled by an electronic tube or tetrode switch 92. The tetrode 92 responds to increase in line current occasioned by increase in torque on the quill driving motor 54. That is, if a bearing under test is of desired quality, the increase in torque on motor 54 will cause the tetrode 92 to conduct sufficiently to open relay 90 to deenergize the magnetic clutch 64 to stop rotation of cam 56.

The quill driving motor 54 is illustrated as a three phase type which may be connected to a suitable source of electric power by main lead wires 100, 102 and 104. A transformer 106 is provided to lower the potential suitably for control instrument circuits and comprises the usual primary coil 108 and secondary coil 110. Lead wires 112 and 114 connect opposite ends of the transformer primary 108 to the main lines 100 and 102 respectively. Connected to opposite ends of the transformer secondary 110 are leads 116, 118 of a circuit which includes the magnetic clutch 64.

A relay 120 controls the magnetic clutch 64 and has the usual coil 122 and a movable armature which carries a contact to engage a pair of fixed contacts 124 to control clutch 64 and a pair of contacts 125 to control brake 65. Relay 120 is normally open with respect to contacts 124 and normally closed with respect to contacts 125. The relay coil 122 is connected to the transformer secondary 110 by leads 126 and 128 in the latter of which there is a push button starter switch 130. A limit switch 131 (see Figs. 1 and 5) is provided to stop cam 56 when the quill 40 returns to its starting position.

The magnetic clutch 64 and brake 65 are operated by direct current supplied by a bridge type rectifier 132 which has alternating current terminals A and B, and direct current terminals C and D. Leads 116 and 118 respectively connect the rectifier terminals A and B to opposite ends of the transformer secondary 110. A lead 134 connects the direct current rectifier terminal C to one of the relay contacts 124, and a lead 136 connects the other contact 124 to one end of the magnetic coil of clutch 64. The other end of the magnetic coil is collected by a lead 138 to the direct current terminal D of the rectifier 132, thus completing the connections from rectifier terminal C through relay contacts 124 and the clutch coil to the other rectifier terminal D. Similarly, a lead 137 connects the direct current terminal C of the rectifier 132 to one of the relay contacts 125, and a lead 139 connects the other contact 125 to the magnetic coil of brake 65, the other end of said coil being connected through lead 138 to the rectifier terminal D.

Relay 120 controls a second pair of contacts 140 of a holding circuit for maintaining coil 122 energized after release of push button switch 130. Relay 90 controls the holding circuit of relay coil 122 and thus is the principal control of the magnet clutch 64.

The relay 90 includes the usual movable armature contact 142, coil 144, and pair of fixed contacts 146. A lead 148 connects one of the fixed contacts 146 to one of the holding relay contacts 140 and the other of the contacts 146 is connected by a lead 150 to lead 128 between the push button switch 130 and the relay coil 122. The other of the contacts 140 of relay 120 is connected by a lead 152 to lead 118 and thus to the transformer secondary 110. Upon pressing the push button switch 130 and pulling up of relay 120, the following holding circuit is completed to relay coil 122: From one end of the transformer secondary 110, through lead 118, lead 152, contacts 140, lead 148 normally closed contacts 146, lead 150, relay coil 122 and through lead 126 to the other end of the transformer secondary 110. Thus, it will be seen that when push button switch 130 is pressed, and relay 120 energized, a circuit to the magnet clutch 64 is completed; the circuit of the brake 65 is broken; a holding circuit for relay 120 is completed; and the holding circuit is under control of principal relay 90.

The electronic devices include the tetrode 92, a rectifier tube 154, and a second rectifier tube 156. The rectifier tubes 154, 156 receive alternating current respectively from secondary coils 158, 161 of a pair of transformers 162, 164, and supply direct current to the tetrode 92.

The tetrode 92 includes an anode 166, a cathode 168, a pair of grids 170, 172, and an indirect heater 174. A lead wire 175 connects anode 166 to one end of relay coil 144 and the other end of said coil is connected by a lead wire 176 to one terminal of transformer secondary 177. Lead wires 178, 180 connect the tetrode heater 174 to terminals of the transformer secondary 179.

Rectifier tube 154 has the usual pair of anodes 182 and a heater 184. Lead wires 186, 188 respectively connect the rectifier anodes 182 to opposite terminals of the transformer secondary 158. Lead wires 190, 192 connect the heater 184 to opposite terminals of the transformer secondary 160. Similarly, rectifier tube 156 includes the usual pair of anodes 194, and a heater 196. Anodes 194 are connected to opposite terminals of the transformer secondary 161, and heater 196 is also connected to opposite terminals of the transformer secondary 197 by leads 199.

The transformer 162 has a primary coil 200 which has one terminal connected by a lead wire 202 to motor 54 and has an opposite terminal connected to main lead wire 100. A resistance 204 is connected to lead 202 and to the primary of transformer 164 such that the resistance and coil 200 are in parallel with each other.

A lead 206 connects the cathode 168 to one terminal of the transformer secondary 177. A pair of leads 199 connect the rectifier tube heater 196 to the transformer secondary 197 and one of the leads is also connected to lead 206. The grid 170 is connected by a lead 201 to lead 175 and anode 166. As connected, the tetrode 92 functions as a triode. A lead 208 connects a center tap of transformer secondary 161 to the negative end of a load potentiometer resistance 212. The positive end of resistance 212 is connected to the lead 206. The resistance 212 is shunted by a filter condenser 210. A potentiometer 214 is adjustably connected across the lower portion of resistance 212. The adjustable contact of potentiometer 214 is connected by lead 216 to the center tap of transformer secondary 158 and to the negative end of a resistance 220, the positive end of which is connected to the heater 184 and to grid 172 of the tetrode by means of resistance 224 and lead 222. A lead 208 connects an adjustable contact of transformer secondary 161 to lead 206, and in lead 206 is a condenser 210 in circuit with which there is a parallel resistance 212. Connected to the resistance and lead 208 is a potentiometer 214. From the adjustable contact of potentiometer 214, a lead 216 connects to a condenser 218 and a resistance 220 which are in parallel and which connect to the tetrode grid 172 by a lead 222 in which there is a resistance 224.

In lead 175, I provide, a meter 226 for registering or indicating to the machine operator the quality of the bearing under test. When tetrode 92 conducts, the meter 226 registers whether or not the established torque for quality bearings is developed by the bearing under test. Also, a signal lamp 228 in line 175 may be provided to register when the bearing under test develops the established torque which will cause tetrode 92 to conduct sufficiently to energize relay 90 and stop cam 56. Relay 90 is of the delayed action type with respect to its circuit closing function so as to allow the operator sufficient time to read the meter 226 before the cam is rotated to its starting position.

Main leads 102 and 104 are directly connected to motor 54, but main lead 100 is connected in circuit such that current flowing therethrough flows through the parallel combination of resistance 204 and transformer primary coil 200 and then to motor 54. Thus, if the current requirement to the motor 54 increases, there will be a corresponding increase in the voltage applied to the transformer primary coil 200. This voltage is stepped up and applied to the plates of rectifier tube 154 which produces a pulsating direct voltage which is filtered to a steady direct voltage by condenser 218, thereby producing a steady direct voltage across resistance 220. Since the voltage across resistance 220 is a function of the current flowing to motor 54 through lead 100, any change in current requirement to motor 54 will effect a corresponding change in voltage developed across resistance 220.

The positive end of resistance 220 is connected to the control grid 172 of tetrode 92, and the positive end of resistance 212 is connected by leads 205, 201 to the tetrode cathode 168. Also resistance 220 has its negative end connected by lead 216 to the adjustment arm of potentiometer 214. The resistance of potentioneter 214 is connected across a portion of resistance 212 at the negative end thereof so that by varying the position of the potentiometer arm, the potential difference between the positive end of resistance 212 and resistance 220 can be varied and hence the potential difference between the cathode and the control grid of the tetrode 92 can be varied. The anode 166 of the tetrode 92 receives its power through relay coil 144 from the transformer secondary coil 177. When the control grid of tetrode 92 is made slightly negative with respect to its cathode 168, the tetrode 92 will not conduct, and relay coil 144 will remain deenergized. However, when the control grid of the tetrode 92 is at zero potential or slightly positive with respect to its cathode, the tetrode 92 will conduct and if the potential increases sufficiently relay coil 144 will be energized.

By means of the potentiometer 214, the motor load at which tetrode 92 will conduct to energize relay coil 144 may be adjusted to a value corresponding to the desired torque of a thrust bearing to be tested. Therefore, if the load on motor 54 increases, as a bearing is being tested, to the value for which the potentiometer 214 is set and the tetrode 92 conducts sufficiently, then relay 144 will be energized to stop cam 56 and meter 226 will register the bearing as satisfactory and the signal lamp will also be lighted to signal the operator to read the meters. As previously mentioned, opening action of relay 90 is delayed to give the operator an opportunity to observe the meter 226 and when the relay opens the cam 56 has already been rotated to starting position before being stopped by the limit switch 31.

When the machine operator pushes button switch 130, relay 120 and its circuit holding contacts 140 are closed and brake contacts are opened. As a result, the clutch 64 is energized to couple the motor 54 to the cam 56 which is then rotated and moves carrier 24 and rotating quill 40 downwardly toward the bearing under test. The lower reduced end 42 of the quill 40 engages in the inner race of the bearing and the quill shoulder 44 engages with the upper end of the race, thus frictionally engaging and rotating the inner race on the roller bearings. Through the spring 66, the cam 56 exerts a gradually increasing axial thrust against the bearing, and if the thrust applies a predetermined torque on the motor 28, the tetrode 92 responds by energizing relay 90 which in turn stops the cam 56. The signal light 238 is energized when the said predetermined torque is reached and it is at this time that the operator should read the shim gage 76 and the torque meter 226. As previously mentioned, the relay 90 has a delayed closing action and this occurs through an arc of the cam approaching the cam starting position. When the delayed closing relay 90 bridges the contacts 146, the magnetic clutch 64 is again energized to return the cam 56 to its starting position. Rotation of the cam is interrupted to give the operator time to observe the torque meter and shim gage. If the bearing does not pass the test, the limit switch 31 will stop the cam 56 in its "up" position. When the cam 56 is stopped, either by tetrode 90 or limit switch 31, relay 120 is deenergized. This deenergizes the clutch 64 and energizes the brake 65.

I have herein referred to the cam 56 as applying a predetermined maximum thrust on the bearing under test, but this should not be taken to mean that each bearing tested must apply a predetermined torque on the motor 58 based on the maximum thrust in order to be classified as a high quality bearing. To clarify this point the following specific example is given: For a given type of bearing to be tested, a norm or standard must be established by which to measure the quality of such bearings. The bearing of the present disclosure is for use in holding the pinion gear of a motor car drive shaft in proper meshed relation with the differential ring gear. For this bearing, I have established by calculation and test that the axial thrust applied to the bearing should start at about 1600 foot pounds and be increased by the cam to about 2200 foot pounds, and that within these limits, the bearing should apply a torque of about 12.5 inch pounds on the quill 40 for the bearing to be classified as a quality bearing. Thus, an unusually well made bearing may register the required 12.5 inch pounds of torque at say 1800 foot pounds of thrust and another acceptable bearing may register the required 12.5 inch pounds of torque at 2000 foot pounds of thrust. However, should the maximum of 2200 foot pounds of thrust be applied to a bearing without registering the required torque, the bearing is rejected as inferior. From the above it will be seen that the proper torque for a given bearing is predetermined and that the applied thrust that will register the predetermined toque may vary within established limits.

While I have shown and described my invention in detail, it will be understood that the invention is to be limited only by the scope of the appended claims.

I claim:

1. Apparatus for testing the accurracy of contact between the rollers and races of a thrust roller bearing comprising, supporting means for the bearing, means operable to rotate one of the races relative to the other, thrust means operable to exert an increasing force urging the races into engagement with the rollers, power means to operate said thrust means, said force calculated to effect a predetermined torque applied to said rotating means for bearings having a passable measure of surface area of the races and rollers in contact, and a control responsive to said predetermined torque to discontinue operation of said thrust means by said power means indicating a passable bearing.

2. Apparatus for testing the accuracy of contact between the rollers and races of a roller bearing comprising, supporting means for the bearing, a rotatable member operable to engage and rotate one of said races relative to the other, said rotatable member being movable axially between a position engaging and rotating said one race and a retracted position, means operable to move said rotatable member into said first position and exert a thrust to urge the races against the rollers, said predetermined thrust calculated to effect a predetermined torque exerted by said rotatable member for bearings having a passable measure of surface area of the races and rollers in contact, and a control responsive to said predetermined torque stopping said operable means indicating a passable bearing.

3. Apparatus for testing the accuracy of contact between the rollers and races of a bearing comprising, supporting means for the bearing engaging and holding one of the races against rotating, a rotatable spindle movable axially from a retracted position to engage and rotate the other race, a rotatable cam operable to move said spindle between said positions and to exert a gradually increasing thrust urging the races against the rollers, said thrust calculated to effect a predetermined torque increase on said spindle for bearings having a passable measure of surface area of the races and rollers in contact, and a control controlling rotation of said cam to stop the cam in response to said predetermined torque.

4. Apparatus for testing the accuracy of contact between the rollers and races of a bearing comprising, supporting means for the bearing engaging and holding one of the races against rotation, a rotatable spindle movable axially from a retracted position to engage and rotate the other of the races, a cam operable to move said spindle between said positions and exert an axial thrust on said spindle to urge the races into engagement with the rollers, said thrust calculated to effect a predetermined torque exerted by said spindle for bearings having a passable measure of surface area of the races in contact with the rollers, an electric motor to rotate said cam, and a control responsive to said predetermined torque to discontinue operation of said cam by said motor.

5. Apparatus for testing the accuracy of contact between the rollers and races of a bearing comprising, supporting means for the bearing engaging and holding one of the races against rotation, a rotatable spindle movable axially from a retracted position to engage and rotate the other of the races, a cam operable to move said spindle between said positions and exert an axial thrust on said spindle to urge the races into engagement with the rollers, said thrust calculated to effect a predetermined torque increase on said spindle for bearings having a passable measure of surface area of the races in contact with the rollers, an electric motor to rotate said cam, a control responsive to said predetermined torque to discontinue operation of said cam by said motor, and time delay means controlled by said control operable to continue operation of said cam by said motor to move said spindle to retracted position.

References Cited in the file of this patent

UNITED STATES PATENTS

| | | |
|---|---|---|
| 1,942,920 | Fawkes | Jan. 9, 1934 |
| 2,091,022 | Stuart | Aug. 24, 1937 |
| 2,398,156 | Puterbaugh | Apr. 9, 1946 |
| 2,427,364 | McKendry | Sept. 16, 1947 |
| 2,471,423 | Gisser | May 31, 1949 |
| 2,586,708 | Petit | Feb. 19, 1952 |
| 2,605,304 | Proctor | July 29, 1952 |